(12) United States Patent
DeLuca

(10) Patent No.: US 9,646,577 B2
(45) Date of Patent: *May 9, 2017

(54) DISPLAY SCREEN HAVING REGIONS OF DIFFERING PIXEL DENSITY

(71) Applicant: BlackBerry Limited, Waterloo (CA)

(72) Inventor: Michael Joseph DeLuca, Boca Raton, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/841,087

(22) Filed: Aug. 31, 2015

(65) Prior Publication Data

US 2015/0371612 A1    Dec. 24, 2015

Related U.S. Application Data

(63) Continuation of application No. 14/184,369, filed on Feb. 19, 2014, now Pat. No. 9,129,347, which is a continuation of application No. 12/907,829, filed on Oct. 19, 2010, now Pat. No. 8,698,859.

(51) Int. Cl.
```
G09G 5/02      (2006.01)
G09G 5/391     (2006.01)
G09G 5/14      (2006.01)
G06T 5/00      (2006.01)
```
(52) U.S. Cl.
CPC .............. G09G 5/391 (2013.01); G06T 5/00 (2013.01); G09G 5/14 (2013.01); G06T 2207/20172 (2013.01); G09G 2330/021 (2013.01); G09G 2340/0407 (2013.01)

(58) Field of Classification Search
CPC .... G09G 5/391; G09G 5/14; G09G 2330/021; G09G 2340/0407; G06T 5/00; G06T 2207/20172
See application file for complete search history.

(56) References Cited

U.S. PATENT DOCUMENTS

| | | |
|---|---|---|
| 5,218,705 A | 6/1993 | DeLuca et al. |
| 5,523,769 A | 6/1996 | Lauer |
| 5,806,501 A | 9/1998 | Osanai |

(Continued)

FOREIGN PATENT DOCUMENTS

| | | |
|---|---|---|
| EP | 2204793 | 7/2010 |
| WO | 2010018881 | 2/2010 |

OTHER PUBLICATIONS

Office Action mailed Sep. 16, 2013, in corresponding Canadian patent application No. 2,751,776.

(Continued)

*Primary Examiner* — Peter D McLoone
(74) *Attorney, Agent, or Firm* — Fish & Richardson P.C.

(57) ABSTRACT

A display device including: a display screen having first region and second region, the first region having a first pixel density and the second region having a second pixel density, the second pixel density being higher than the first pixel density, an input for receiving image data, a power source; and wherein the display screen is operable in a full screen mode in which an image is displayed in both the first region and the second region and a reduced screen mode in which power to the first region is turned off and the image is displayed in the second region.

18 Claims, 7 Drawing Sheets

(56) References Cited

U.S. PATENT DOCUMENTS

| | | | |
|---|---|---|---|
| 5,867,140 A | 2/1999 | Rader | |
| 5,920,327 A | 7/1999 | Seidensticker | |
| 6,137,481 A | 10/2000 | Philipps | |
| 6,175,352 B1* | 1/2001 | Kay | G09G 3/3674 345/100 |
| 6,388,679 B1* | 5/2002 | Kluck | G09G 5/14 345/698 |
| 6,414,650 B1 | 7/2002 | Nicholson | |
| 6,809,711 B2 | 10/2004 | Funston | |
| 6,812,907 B1 | 11/2004 | Gennetten | |
| 6,900,788 B2 | 5/2005 | Yamazaki | |
| 7,081,870 B2* | 7/2006 | Bronson | G02B 27/017 345/698 |
| 7,333,071 B2 | 2/2008 | Baudisch et al. | |
| 7,475,356 B2* | 1/2009 | Baudisch | G06F 3/1438 715/700 |
| 7,495,638 B2 | 2/2009 | Lamvik | |
| 7,502,010 B2 | 3/2009 | Kirk | |
| 7,546,540 B2 | 6/2009 | Baudisch et al. | |
| 7,629,945 B2 | 12/2009 | Baudisch | |
| 8,290,540 B2* | 10/2012 | Kittel | G06F 3/0481 345/660 |
| 8,314,814 B2 | 11/2012 | Gibbons | |
| 8,319,805 B2* | 11/2012 | Chin | G09G 5/391 345/3.4 |
| 8,339,429 B2* | 12/2012 | Canu | G09G 3/3426 345/698 |
| 8,519,925 B2* | 8/2013 | Phan | G09G 3/342 345/204 |
| 8,520,819 B2* | 8/2013 | Brieskorn | G06F 3/1423 345/3.3 |
| 2002/0167458 A1* | 11/2002 | Baudisch | G06F 3/1438 345/1.1 |
| 2002/0167459 A1 | 11/2002 | Baudisch | |
| 2002/0167460 A1 | 11/2002 | Baudisch | |
| 2002/0167461 A1* | 11/2002 | Bronson | G02B 27/017 345/7 |
| 2002/0167531 A1 | 11/2002 | Baudisch | |
| 2002/0175887 A1 | 11/2002 | Yamazaki | |
| 2004/0227703 A1 | 11/2004 | Lamvik et al. | |
| 2006/0044254 A1 | 3/2006 | Kirk | |
| 2006/0227122 A1 | 10/2006 | Proctor | |
| 2008/0129760 A1* | 6/2008 | Phan | G09G 3/342 345/690 |
| 2009/0033675 A1* | 2/2009 | Hunt | G06F 3/0338 345/589 |
| 2009/0085895 A1 | 4/2009 | Memo | |
| 2009/0160872 A1 | 6/2009 | Gibbons | |
| 2009/0207195 A1* | 8/2009 | Chin | G09G 5/391 345/699 |
| 2009/0298545 A1* | 12/2009 | Kittel | G06F 3/0481 455/566 |
| 2010/0020092 A1* | 1/2010 | Canu | G09G 3/3426 345/589 |
| 2010/0164857 A1 | 7/2010 | Liu | |
| 2012/0002802 A1* | 1/2012 | Brieskorn | G06F 3/1423 379/428.03 |

OTHER PUBLICATIONS

T.F. Wu et al, "Sequential Color LED Backlight Driving System for LCD Panels with Area Control", Abstract (http://ieeexplore.ieee.org/Xplore/login.jsp?reload=true &url=http%3A%2F%2Fieeexplore.ieee.lrg%2Fiel5%2F4341939%2F4341940%2F04342490.pdf%3Farnumber%3D4342490&authDecision=203); pp. 2947-2952; Jun. 17-21, 2007.

H. Shim et al, "A Backlight Power Management Framework for Battery-Operated Multimedia Systems", IEEE Design and Test of Computers, Special Issue on Embedded Systems for Real-Time Multimedia 1, (http://atrak.usc.edu/~massoud/Papers/backlit-pm-dnt2004.pdf); vol. 21 issue 5; publication year: 2004, pp. 388-396.

Extended European Search report mailed Dec. 22, 2011, in corresponding European patent application No. 10190266.6.

Johan, "World's First Laptop with GeForce GT 120M GPU", Feb. 12, 2009 (http://www.techfresh.net/worlds-first-_laptop-with-geforce-qt-120m-gpu/).

Office Action mailed Sep. 4, 2014 in Canadian patent application No. 2,751,776.

\* cited by examiner

DISPLAY SCREEN HAVING REGIONS OF DIFFERING PIXEL DENSITY

CROSS-REFERENCE TO RELATED APPLICATION

This application is a continuation of U.S. application Ser. No. 14/184,369, filed Feb. 19, 2014 which is a continuation of U.S. application Ser. No. 12/907,829, filed Oct. 19, 2010 and issued as U.S. Pat. No. 8,698,859 on Apr. 15, 2014, which are fully incorporated by reference herein.

TECHNICAL FIELD

The present embodiments relate to display screens.

BACKGROUND

When operating any type of electronic device having a display screen (which may be referred to for convenience as a "display device"), it is desirable to reduce the amount of power that is consumed. For desktop computers, for example, conserving power reduces operating costs, while for laptop computers and other portable electronic devices, conserving power may extend battery life.

As laptop display screens, for example, continue to increase in size, such as 17 inch (43 cm) and larger screens, the impact on the battery life becomes more significant. Liquid Crystal Display (LCD) screens may include a backlight panel that is on when the display screen is on. One technique for conserving power is to reduce the brightness of the display screen or backlight panel. This power conservation method has the disadvantage that the dimmer display may degrade the visual experience of viewing the information for the user.

Since display screens may consume a significant portion of the power consumed by electronic display devices, other methods for reducing the amount of power consumed by display screens are desirable.

DRAWINGS

The following figures set forth embodiments in which like reference numerals denote like parts. Embodiments are illustrated by way of example and not by way of limitation in the accompanying figures.

DETAILED DESCRIPTION

There is provided herein a method for conserving illumination power of a display screen including: consuming power by displaying a larger illuminated image on the display screen and conserving power by reducing the size and increasing the resolution of the illuminated image on the display screen.

There is provided herein a display device including: a display screen having first region and second region, the first region having a first pixel density and the second region having a second pixel density, the second pixel density being higher than the first pixel density; an input for receiving image data; and a power source; wherein the display screen is operable in a full screen mode in which an image is displayed in both the first region and the second region and a reduced screen mode in which power to the first region is turned off and the image is displayed in the second region.

There is further provided herein a method of operating a display screen, the display screen in communication with a processor and a source of power, the method comprising: illuminating a first region and a second region of the display screen to display a first image, the second region having a higher pixel density than the first region; receiving, at the processor, a power conservation signal; and turning off power to the first region of the display screen in response to the power conservation signal; wherein illumination of the second region is continuous.

Figure 1:
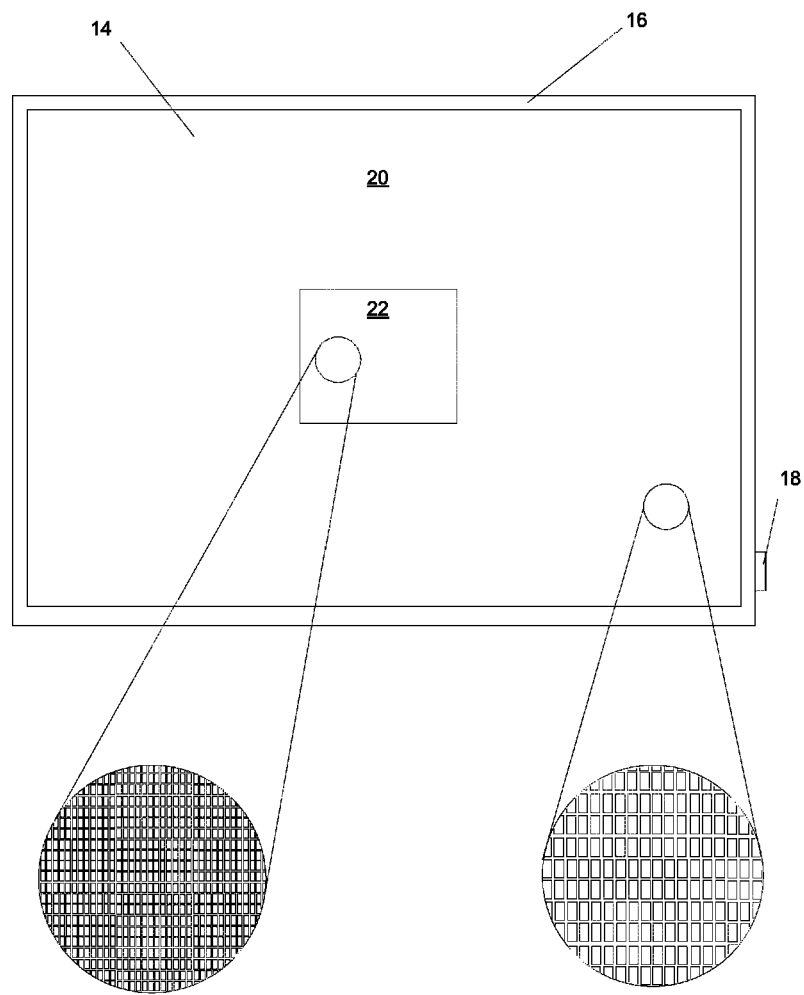
FIG. 1 is a schematic front view of a display screen of a display device according to an embodiment.

Referring to FIG. 1, a display device 10 includes a display screen 14, which is mounted in a housing 16, and an input 18. Input 18 may be a port for coupling to a cable or may be a wireless receiver. In one embodiment the input 18 receives data (which may include photographs, video, graphical elements or any other data that may be displayed in any fashion on the display device 10) and power. In another embodiment, separate data and power inputs are provided. The display screen 14 may be a liquid crystal display (LCD) screen including a thin film transistor LCD screen with a multi-segment electro luminescence (EL) backlighting panel. Alternatively, the display screen 14 may be a plasma display screen, light emitting diode (LED) or another type of illuminated display screen. The display screen 10 may be a stand-alone component, or may be a part of a larger system or collection of components. For example, the display screen may be a part of a television, laptop or desktop computer system, smart phone, touch screen input/output interface, gaming system, and the like.

The display screen 14 includes a first region 20 and a second region 22. In an LCD screen embodiment, the first region 20 includes a corresponding first EL portion (not shown) and the second region 22 includes a corresponding second EL portion (not shown) that is independently operable from the first EL portion. The second region 22 may be generally rectangular-shaped and may be located centrally within in the display screen 14. In the embodiment depicted in FIG. 1, the area of the second region 22 is approximately one-sixteenth the area of the first region 20. The shape of second region 22, the location of the second region 22 in relation to the display screen 14 as a whole, and the relative sizes of the second region 22 with respect to the first region 20 are merely illustrative, and the concepts are not restricted to the particular embodiment depicted in FIG. 1. Further, the concept described herein may be applicable to a display screen that has two or more regions that are like the second region 22. As shown, a first pixel density of the first region 20 is lower than a second pixel density of the second region 22. The respective pixel densities are often measured in pixels per unit length; such as pixels per inch (ppi) and are typically determined at the time of display screen manufacture. For example, the first region 20 may be the size of a laptop display with a 14 inch (36 cm) 1024×768 XGA (Extended Graphics Array) display having a pixel density of 90 ppi and the second region 22 may be approximately the size of a handheld device screen, such as a PDA (Personal Digital Assistant) or smart phone with a 3.25 inch (8.25 cm) 480×360 VGA (Video Graphics Array) display having a pixel density that is twice the pixel density of the first region 20.

The display screen 14 is operable in a full screen mode, in which illuminated images fill both the first region 20 and the second region 22, and a reduced screen mode, in which illuminated images fill the second region 22 only. Reduced screen mode also includes situations in which illuminated images fill part of the second region 22, and situations in which there may be some slight image spill-over into the first region 20. When operating in the full screen mode, the resolution of the display screen is less than or equal to a full screen maximum resolution, which is determined based on the first pixel density of the first region 20. In the full screen mode, images may appear seamless to the user so that the second region 22 is generally undetectable. When operating in the reduced screen mode, the resolution of the second region 22 is increased. Based on the respective pixel densities, the reduced screen maximum resolution is higher than the full screen maximum resolution. The reduced screen mode may conserve power by turning off power to the first region 20 and illuminating the second region 22 only or illuminating part of the second region 22 or illuminating the second region 22 principally. "Turning off" power to the first region 20 may include completely shutting down all power to the first region 20 and may also include putting the first region 20 into a low-power or standby mode, or causing the first region to turn black or monochromatic or the like.

In one embodiment, the second region 22 has a pixel density 2× the pixel density of the first region 20. In another embodiment, the second region 22 has a pixel density that is more than 2× the pixel density of the first region 20.

The reduced screen mode is used to display high resolution images in a relatively small area. In one implementation, an image in regular resolution on the full screen can be comparable to ordinary display of images on the display screen, while displaying a high resolution image in the second region 22 can be comparable to displaying an image on a smaller portable, typically handheld, electronic device. In this way, displaying a high resolution image in the second region 22 can simulate the user experience when operating a handheld device, such as a smart phone or a PDA, for example. Because many users are accustomed to viewing handheld device screens, operating a larger screen display device 10 in a reduced screen mode is an easy transition. Some images may be more suited to display in a reduced screen mode than others. Such images may include video, electronic book images and e-mail message images, for example.

In one example, the first region 20 has a ppi corresponding to a 14 inch VGA screen. The first region 20 includes substantially 0.74 mega pixels, which is the standard 0.786 megapixel XGA screen less the second region 22. The second region 22 has a ppi substantially corresponding to a 3.25 inch XGA screen and includes 0.17 mega pixels. Thus, display screen 14 includes 0.91 megapixels, the sum of the pixels of regions 20 and 22.

Figure 2:
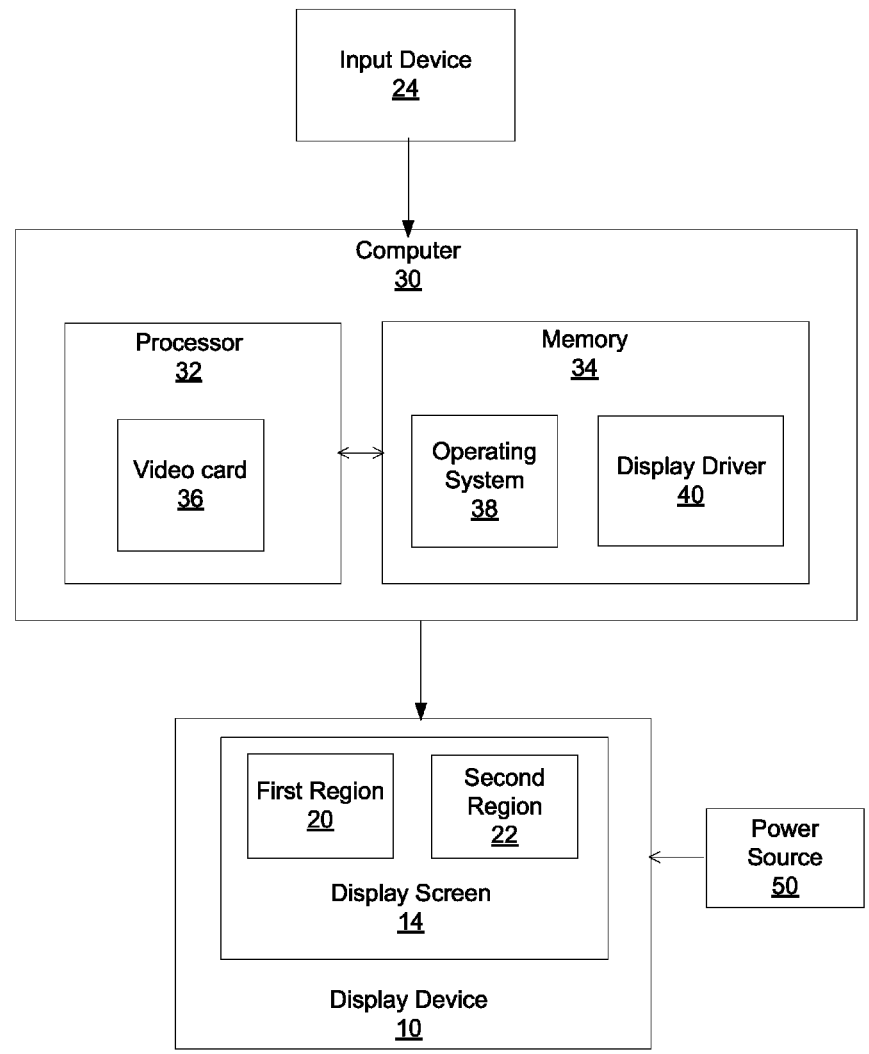
FIG. 2 is a block diagram of a display device according to an embodiment.

Referring to FIG. 2, the display device 10 is shown in communication with a computer 30. The computer 30 includes a processor 32, which controls overall operation thereof. A video card 36 communicates with the processor 32 and generates graphic elements based on image data received from the processor 32. This process is referred to as rendering and generally includes mapping out the graphic elements in preparation for display. The processor 32 and video card 36 are generally circuit boards that are coupled to one another. The processor 32 and video card 36 may alternatively be provided in a single circuit board.

The processor 32 communicates with a Random Access Memory (RAM) (not shown) and a flash memory 34. An operating system 38, display driver 40 and software are typically stored in flash memory and are executable by the processor 32. The display driver 40 functions to translate software commands that are stored in memory 34 into commands for controlling the display device 10.

In the 14 inch VGA screen and 3.25 inch XGA screen example, while the display driver 40 is adapted to drive the 0.91 megapixel display screen 14, the pixel memory in display driver 40 need only be capable of rendering a 0.786 or smaller megapixel image. In the full screen mode, four adjacent pixels in the second region 22 can be redundantly driven by rendered image data corresponding to one pixel in first region 20, thus providing an XGA image having the same resolution in first and second regions 20, 22. In the reduced screen mode, the pixel memory in display driver 40 need only be capable of rendering 0.17 megapixel XGA image in second region 22, eliminating the redundant driving of pixels from the full screen mode and independently driving each pixel in second region 22.

The computer 30 includes computer executable programmed instructions for directing the computer 30 (or a tangible component of the computer 30 or a tangible device controlled by computer 30) to implement various applications. Some examples of applications that may be stored on and executed by the computer include: electronic messaging, games, calendar, address book and music player applications. It will be appreciated by a person skilled in the art that the flash memory may alternatively be a persistent storage, a Read-Only Memory (ROM) or other non-volatile storage. Some software components may alternatively be stored in RAM.

The processor 32 receives input from an input device 24, such as a keyboard, multifunction buttons, a touch pad, a touch screen, a mouse or a trackball, for example. The input device 24 may include a single device or more than one device. The computer 30 outputs image data to the display device 10 for display on the display screen 14. The processor 32 may further output to other devices (not shown) including an auxiliary display screen and a speaker, for example.

The display screen 14 switches between the full screen mode and the reduced screen mode when a signal (which will be referred to for convenience as a "power conservation signal") is received by the processor 32. Power conservation signals may be generated when reduced screen-suitable images are to be displayed and the power to the first region 20 is turned off. For example, a power conservation signal may be generated when: an electronic book application is launched, an email message is opened or a video application is launched, for example. Launching of applications and opening of email messages is well known in the art. These operations may be performed by a user operating the input device 24. For example, an application may be launched by user selection of an application icon on a desktop or navigation through menus. Similarly, an email message may be opened when a user double clicks on a message using a mouse or highlights the message and selects "open" from a menu, for example.

Figure 3:
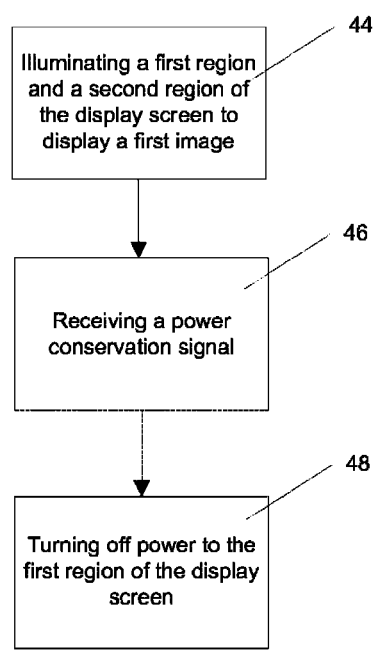
FIG. 3 is a flowchart depicting a method of conserving power when operating a display device according to an embodiment.

Referring to FIG. 3, a method for conserving power when operating the display device 10 is generally shown. The method is stored as a computer-readable file that includes instructions corresponding to the method and is executable by the processor 32. The method generally applies when the display screen 14 is in communication with the processor 32 and a power source. The method includes; at step 44, illuminating a first region 20 and a second region 22 of the display screen 14 to display a first image, the second region having a higher pixel density than the first region; at step 46, receiving, at the processor 32, a power conservation signal; at step 48, turning off power to the first region 20 of the display screen 14, the power being turned off in response to the power conservation signal and illumination of the second region is continuous to display a second image. In general, illumination of the second region is "continuous" in the sense that the second region does not get turned off while the first region does get turned off. Although it may be advantageous for illumination of the second region to show no change whatsoever, the illumination of the second region may be deemed "continuous" even if there are some transient or transitional changes in illumination of the second region when the first region is turned off.

Figure 4A:
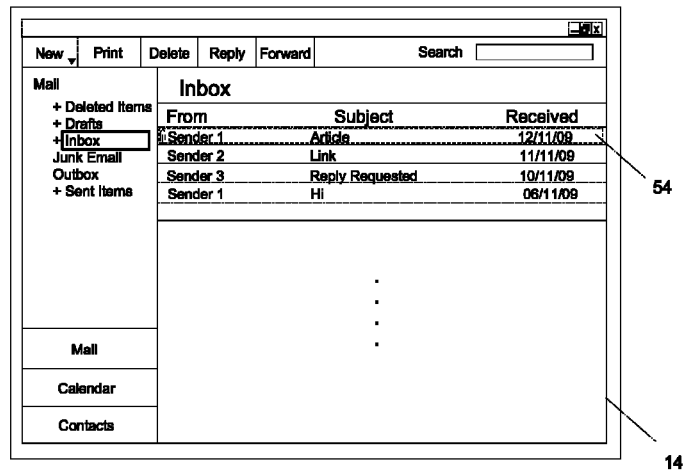
FIG. 4A is a front view of display screen operating in a full screen mode.
Figure 4B:
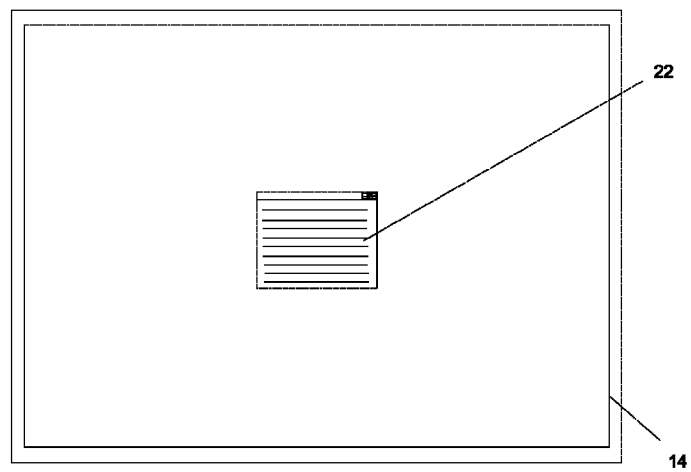
FIG. 4B is a front view of a display screen operating in a reduced screen mode.

Referring to FIGS. 4A and 4B, an example of a software, such as an email application, being displayed on the display screen 14 is provided. In FIG. 4A, the display screen 14 is operating in a full screen mode and in FIG. 4B, the display screen 14 is operating in a reduced screen mode.

As shown in FIG. 4A, a window of an email application is displayed. Opening an email message 54 sends a power conservation signal to the processor 32. In response to the power conservation signal, power to the first region 20 is turned off and a message window corresponding to email message 54 is displayed in the second region 22, as shown in FIG. 4B and FIG. 5.

Figure 5:
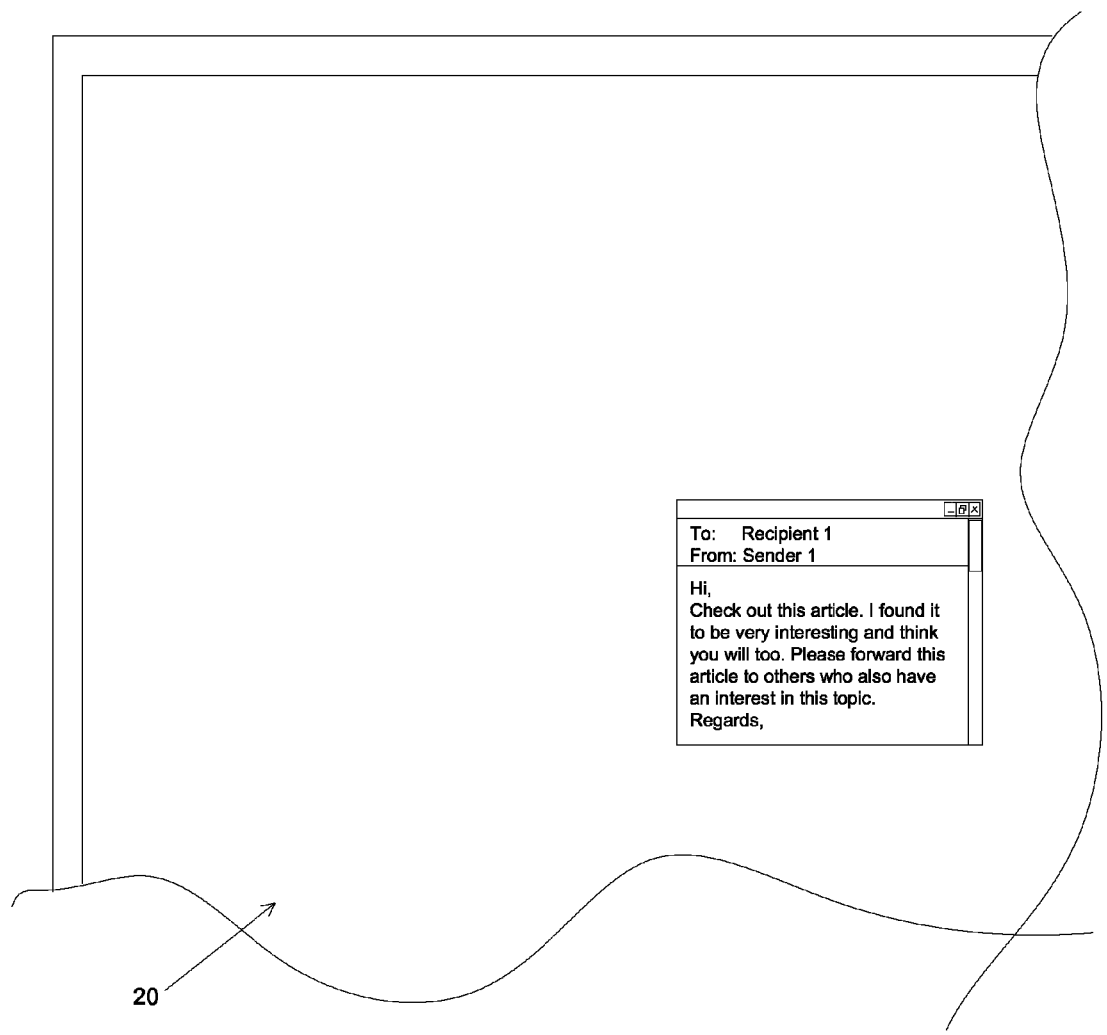
FIG. 5 is an enlarged view of portions of FIG. 4B.

In another example, opening a movie could result in a similar sequence of display size reduction, with the movie opened in a full screen user interface displayed corresponding to FIG. 4A and viewed within in the reduced display area of FIG. 4B and FIG. 5. Watching a two hour movie on a laptop with a 14 inch XGA display can place a significant demand on the battery, however, watching the same movie within a 3.25 inch VGA display region provides an illumination area that is 5% of the 14 inch XGA screen and can conserve up to 95% of the power expended for screen illumination, thereby substantially extending the battery life of the device while providing an acceptable video viewing experience.

Figure 6:
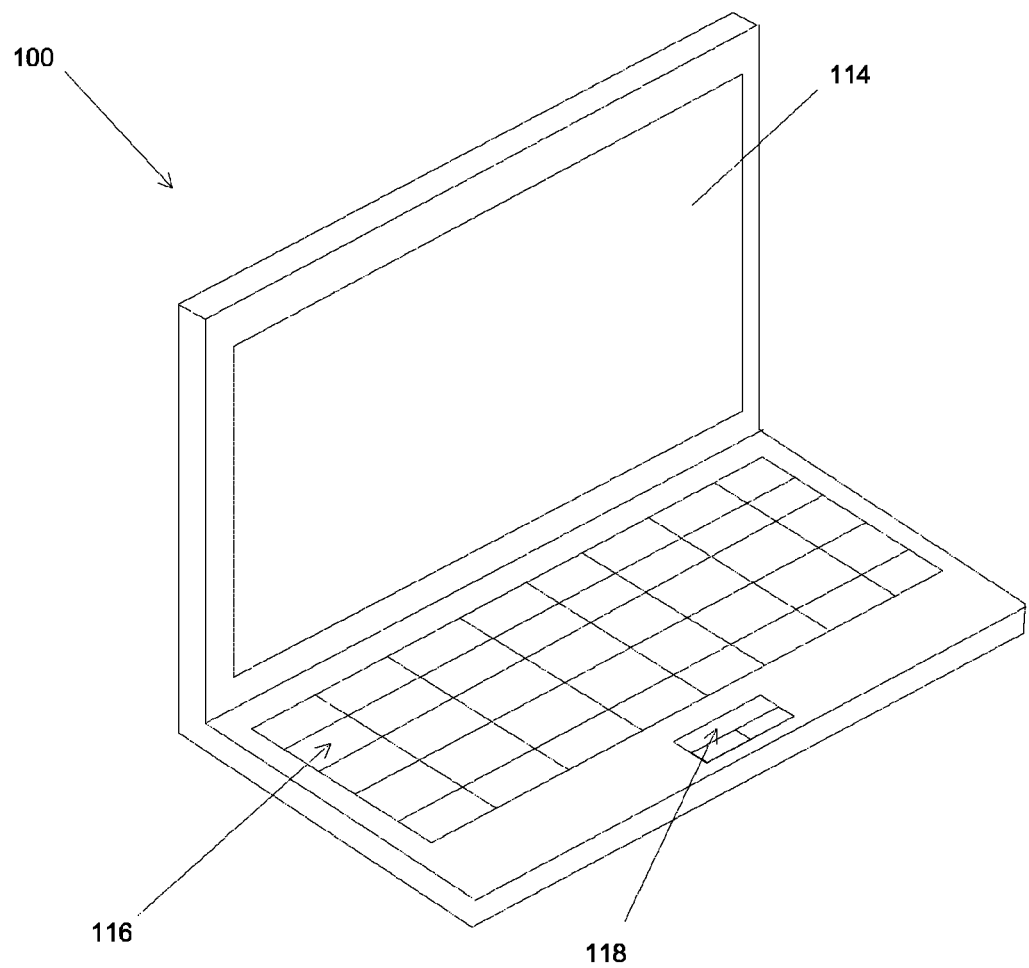
FIG. 6 is an isometric view of an example of a display device according to an embodiment.

Referring to FIG. 6, an example of a display device 10 is shown. In this example, the display device 10 is a monitor of a laptop computer 100. The monitor includes a Liquid Crystal Display (LCD) display screen 114, a keyboard 116 and a touch pad 118. The laptop computer 100 may be provided in communication with a network, such as the Internet, a Local Area Network (LAN) or a Wide Area Network (WAN), for example. The laptop computer 100 may be in wireless communication with the network or may communicate with the network via a wired connection. Direct communication with other computers may also occur directly via Bluetooth™ technology, for example. Alternatively, the laptop computer 100 may not communicate with the network and may operate independently.

Figure 7A:
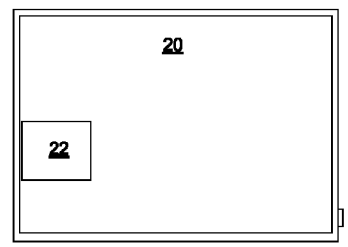
FIGS. 7A-7C are schematic front views of alternate embodiments of the display screen of FIG. 1.
Figure 7B:
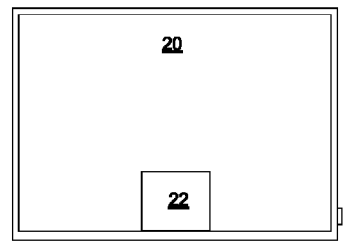
Figure 7C:
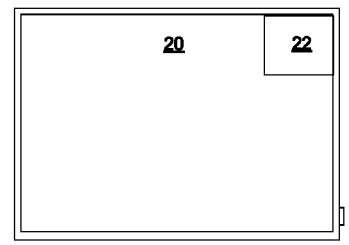

Referring to FIGS. 7A-7C, the second region 22 is not limited to being provided centrally relative to the first region 20. The second region 22 may be provided at a left side, a bottom side or a corner, for example, as shown.

It will be appreciated by a person skilled in the art that the display device 10 may be any device including a display screen of a typical display device including: a monitor for a desktop computer or an auxiliary monitor of a desktop or laptop or pad-type computer, a television, portable DVD player, a PDA or even a portable communication device such as a cell phone or pager where the image size is reduced while its resolution is increased to preserve power while facilitating an enhanced viewing experience.

In one embodiment, the brightness of the second region 22 may be dimmed to provide further power conservation for LCD screen applications.

In another embodiment, the first region 20 and the second region 22 are operated together, however, the second region 22 is operated at a resolution that is greater than the full screen maximum resolution. In one example, high resolution images may be displayed in the second region 22 while text is displayed in the first region 20.

The embodiments disclosed herein may reduce the amount of power consumed by a display screen when reduced screen-suitable images are displayed. By turning a portion of the screen illumination off during display of reduced screen-suitable images, less power may be consumed. These embodiments need not be exclusive of other power-saving techniques.

Although the concepts have been described herein as providing a potential benefit of power-saving, power-saving is not essential to the concepts. There conceivably may be circumstances in which the concepts described herein may provide no power-saving, and generation of the power conservation signal does not result in an actual conservation of power. Further, other potential benefits may be realized, including the ability to focus in on selected portions of an image, making details more visible at a high resolution, or making ready adaptation of small-screen-high-resolution software applications on a larger display screen.

Specific embodiments have been shown and described herein. However, modifications and variations may occur to those skilled in the art. All such modifications and variations are believed to be within the scope and sphere of the present embodiments.

The invention claimed is:

1. A method, comprising:
    illuminating a first region and a second region of a display screen of a device to display a first image, the first region having a first pixel density and the second region having a second pixel density that is greater than the first pixel density, wherein the first image is displayed at a same first resolution in the first region and the second region;
    receiving a power conservation signal in response to a function performed by an application running on the device; and
    in response to receiving the power conservation signal, updating illumination of the display screen to display a second image at a second resolution in the second region, the second resolution being higher than the first resolution and higher than a maximum image resolution based on the first pixel density.

2. The method of claim 1, wherein updating illumination comprises at least one of shutting down power to the first region, operating the first region at a lower power, or operating the first region in a monochromatic mode.

3. The method of claim 2, further comprising operating the second region at a lower power.

4. The method of claim 1, wherein updating illumination comprises:
    turning off power to the first region; and
    wherein the first image is displayed as the second image in the second region with a resolution that is greater than the first resolution.

5. The method of claim 1, wherein the second region is centrally located relative to the first region.

6. The method of claim 1, wherein the function comprises the application launching a separate window.

7. A device, comprising:
    a display configured to illuminate a first region and a second region of a display screen of a device to display a first image, the first region having a first pixel density and the second region having a second pixel density that is greater than the first pixel density, wherein the first image is displayed at a same first resolution in the first region and the second region;
    one or more processors configured to receive a power conservation signal in response to a function performed by an application running on the device; and
    the display further configured to, in response to receiving the power conservation signal, update illumination of the display screen to display a second image at a second resolution in the second region, the second resolution being higher than the first resolution and higher than a maximum image resolution based on the first pixel density.

8. The device of claim 7, wherein update illumination comprises at least one of shut down power to the first region, operate the first region at a lower power, or operate the first region in a monochromatic mode.

9. The device of claim 8, the display further configured to operate the second region at a lower power.

10. The device of claim 7, wherein update illumination comprises:
    turn off power to the first region; and
    wherein the first image is displayed as the second image in the second region with a resolution that is greater than the first resolution.

11. The device of claim 7, wherein the second region is centrally located relative to the first region.

12. The device of claim 7, wherein the function comprises the application launching a separate window.

13. A non-transitory computer readable medium storing instructions to cause a processor to perform operations comprising:
    illuminating a first region and a second region of a display screen of a device to display a first image, the first region having a first pixel density and the second region having a second pixel density that is greater than the first pixel density, wherein the first image is displayed at a same first resolution in the first region and the second region;
    receiving a power conservation signal in response to a function performed by an application running on the device; and
    in response to receiving the power conservation signal, updating illumination of the display screen to display a second image at a second resolution in the second region, the second resolution being higher than the first resolution and higher than a maximum image resolution based on the first pixel density.

14. The computer readable medium of claim 13, wherein updating illumination comprises at least one of shutting down power to the first region, operating the first region at a lower power, or operating the first region in a monochromatic mode.

15. The computer readable medium of claim 14, the instructions further comprising operating the second region at a lower power.

16. The computer readable medium of claim 13, wherein updating illumination comprises:
    turning off power to the first region; and
    wherein the first image is displayed as the second image in the second region with a resolution that is greater than the first resolution.

17. The computer readable medium of claim 13, wherein the second region is centrally located relative to the first region.

18. The computer readable medium of claim 13, wherein the function comprises the application launching a separate window.

* * * * *